United States Patent [19]
Keilert et al.

[11] Patent Number: 5,118,270
[45] Date of Patent: Jun. 2, 1992

[54] DEVICE FOR COOLING AND GRANULATING MOLTEN STRANDS

[75] Inventors: Jurgen Keilert, Kleinwallstadt; Alfred Nogossek, Wurzburg; Harald Zang, Kleinostheim, all of Fed. Rep. of Germany

[73] Assignee: Automatik Apparate-Maschinenbau GmbH, Grossostheim, Fed. Rep. of Germany

[21] Appl. No.: 696,507

[22] Filed: May 7, 1991

[30] Foreign Application Priority Data

Aug. 21, 1990 [DE] Fed. Rep. of Germany ....... 4026337

[51] Int. Cl.$^5$ .............................................. B29C 47/00
[52] U.S. Cl. .................................. 425/72.1; 425/72.2; 425/308
[58] Field of Search ................... 264/141, 178 F, 237; 425/67, 68, 71, 72.2, 72.1, 308, DIG. 230

[56] References Cited

U.S. PATENT DOCUMENTS

| | | | |
|---|---|---|---|
| 2,879,566 | 3/1959 | Pond | 425/72.2 |
| 3,502,763 | 3/1970 | Hartmann | 425/72.2 |
| 3,594,870 | 7/1971 | Schippers et al. | 425/71 |
| 4,025,252 | 5/1977 | Hunke | 425/71 |
| 4,180,539 | 12/1979 | Clarke | 425/71 |
| 4,632,752 | 12/1986 | Hunke | 425/71 |

FOREIGN PATENT DOCUMENTS

| | | |
|---|---|---|
| 0236657 | 9/1987 | European Pat. Off. |
| 2559541 | 2/1977 | Fed. Rep. of Germany |
| 3433791 | 3/1986 | Fed. Rep. of Germany |
| 8708816 | 8/1988 | Fed. Rep. of Germany |
| 3900250 | 7/1990 | Fed. Rep. of Germany |
| 2284420 | 4/1976 | France |
| 59-196227 | 11/1984 | Japan |
| 61-119512 | 6/1986 | Japan |

Primary Examiner—Richard L. Chiesa
Assistant Examiner—C. Scott Bushey
Attorney, Agent, or Firm—Banner, Birch, McKie & Beckett

[57] ABSTRACT

An apparatus to cool and granulate strands discharged in a molten state from nozzles, particularly strands formed of plastics materials, includes a feeder trough having at its receiving end a collecting region disposed below the nozzles and a granulator at the opposite end thereof. The feeder trough includes over its entire length, a collecting region and a transport region, a longitudinally grooved perforated plate or screen material in which only a single strand is conducted along each groove, the strands being borne and guided along the grooves of the feeder trough by a gas current that passes through the plate material, aided by longitudinally directed gas current that may be blown along the grooves from a source disposed at the receiving end of the trough ahead of the collecting region.

8 Claims, 4 Drawing Sheets

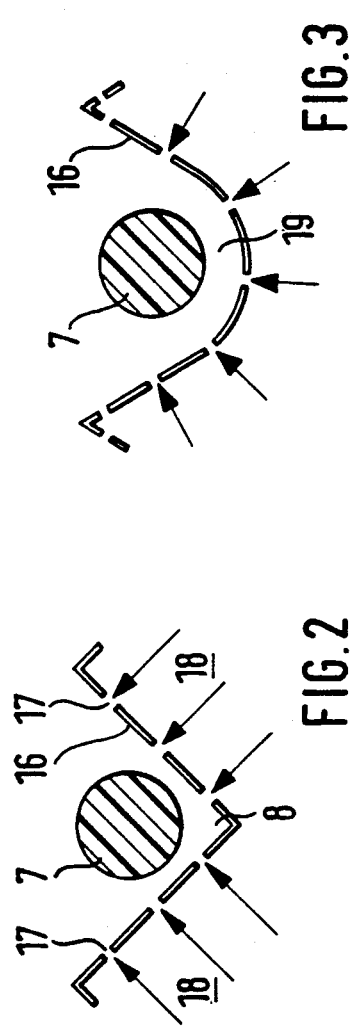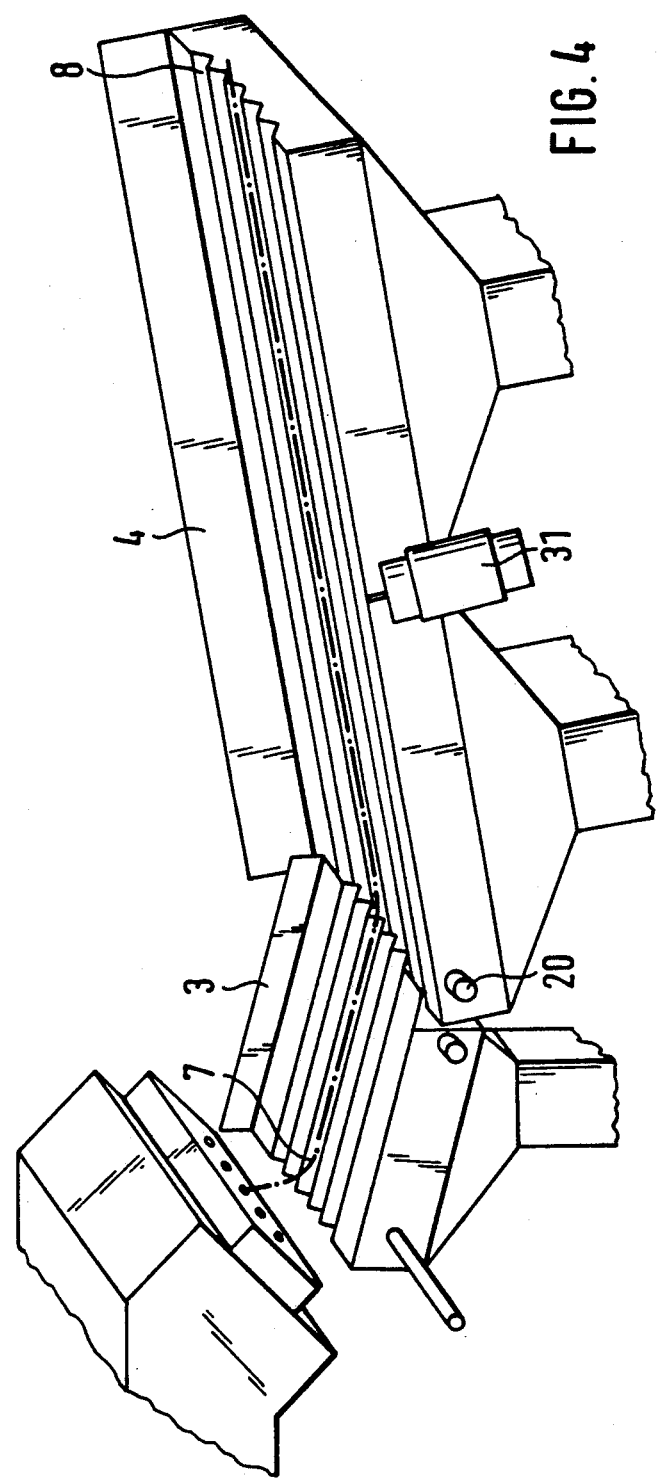

DEVICE FOR COOLING AND GRANULATING MOLTEN STRANDS

BACKGROUND OF THE INVENTION

The invention relates to the processing of molten strands, particularly of plastics material.

Such a device is known from DE-PS 39 00 250. In this device strands exiting from the nozzles in a molten state are cooled by a liquid coolant spray that is directed onto a discharge channel, to the upper end of which the molten stands are fed. Owing to this form of cooling of the strands, it is necessary that they be dried. Such drying is done in the known device in that the discharge channel is followed by a dewatering region from which the cooled and dried strands are then introduced into a granulator. In so doing, drying occurs in the dewatering region, whose bottom is provided with entry nozzles for a gas current so that the strands, guided in the dewatering region, are guided largely without friction between them and the bottom of the dewatering region, the strands being thus simultaneously dried by the gas current flowing by the strands.

It is to the reduction of cost in processing molten strands by the known device to which the present invention is directed.

SUMMARY OF THE INVENTION

According to the present invention, therefore, there is provided apparatus to cool and granulate strands, particularly strands made of plastics material, exiting in the molten state from nozzles including a feeder trough arranged with its receiving end positioned below the nozzles, and having a granulator following the feeder trough, wherein the feeder trough comprises, substantially over its entire length, longitudinally grooved plate means formed of perforate material in which only one strand is guided in each groove, and along which the strands are borne and guided along the feeder trough by a gas current passing through the plate at an end of the feeder trough adjacent position thereon for collecting strands, the gas current being defined by a longitudinally directed gas flow blown into the grooves.

Owing to the design of the apparatus of the invention, liquid coolants employed in the operation of the known apparatus is avoided. Consequently, any drying problem is eliminated. Also, the transport function for the strands is assumed in its entirety by the gas current that passes through the longitudinally grooved plate formed of perforated or screen material. There results the special advantage that, by cooling with the gas current, the material of the strands is not quenched with liquid as is the case of cooling in known apparatus, but instead, because the strands are cooled slowly and uniformly by the flow of gas, such cooling avoids the occurrence of internal stresses in the strands, which, in the case of especially sensitive materials, if cooled by quenching, can lead to the destruction of the material. Furthermore, by means of the longitudinally directed gas current being blown into the grooves, the strands are oriented and conducted in the direction of the collecting region of the device and thereafter moved into the transport region without danger of adhering to the elements of the collecting region.

A suitable medium for the gas current is primarily air, yet in the case of especially sensitive materials, it is also possible to use inert gas (e.g. nitrogen).

To facilitate the reliable transport of strands exiting from the nozzles into the collecting region and, thence, in the direction of the transport region, the collecting region can be tilted at an angle of at least about 10° relative to a horizontal line.

To generate a longitudinally directed gas current at the receiving end of the feeder trough, special gas nozzles are provided, preferably in the collecting region, and are disposed in such a manner that a gas current for guiding and collecting the strands is generated in each groove. This gas current in each groove assumes the task of immediately rerouting the strands exiting from the nozzles into the collecting region. Therefore, the collection region can also be disposed horizontally.

To provide the collecting region and subsequent transport region with a gas current containing sufficient and uniform gas flow several mutually adjoining gas supply chutes are provided, preferably below the feeder trough. These gas supply chutes can be, if desired, individually controlled with respect to the quantity and the flow rate of gas supplied in order to provide the individual regions of the feeder trough with sufficient gas, as needed.

If a perforated plate is used as the base for the feeder trough, the openings in the perforated plate are preferably inclined in the direction the strands are moving, whereby, in addition to lifting the strands from the surface of the feeder trough, the gas current passing through the openings provides a transport component acting on the strands to induce their movement in the direction toward the opposite end of the feeder trough.

Owing to the effect of the gas current, both in the sense of carrying and guiding the strands, the feeder trough can be set over a wide range of angular orientation relative to a horizontal line and, in particular, in such a manner that the effect of any rise of the feeder trough in the feeding direction is negligible. The advantage here resides in the fact that the granulator following the feeder trough having relatively raised mouth is readily accommodated.

The collecting region of the feeder trough can be pivoted or moved separately with respect to the subsequent transport region so that, when starting up the device, the strands that are frequently still unclean during this phase of the operation can be diverted from the collecting region into a waste container. The pivotability of the collecting region also enables it to be adapted to the various characteristics of the particular strand materials, as for example, to give the collecting region a steeper attitude when processing a strand material having a sticky consistency.

The transport function in the transport region of the feeder can be improved by providing the transport region with a vibrator to generate a thrust component for the strands. This is especially important when the transport region is inclined slightly upwardly.

BRIEF DESCRIPTION OF THE DRAWINGS

In the following figures, which illustrate the embodiments of the invention:

FIG. 2 is a sectional view of a single angular groove of the feeder trough;

FIG. 3 shows a variation of the configuration of FIG. 2 in which the groove is parabolic;

FIG. 4 shows an arrangement according to FIG. 1 in which the transport region is directed slightly upwardly;

DESCRIPTION OF A PREFERRED EMBODIMENT OF THE INVENTION

Figure 1:
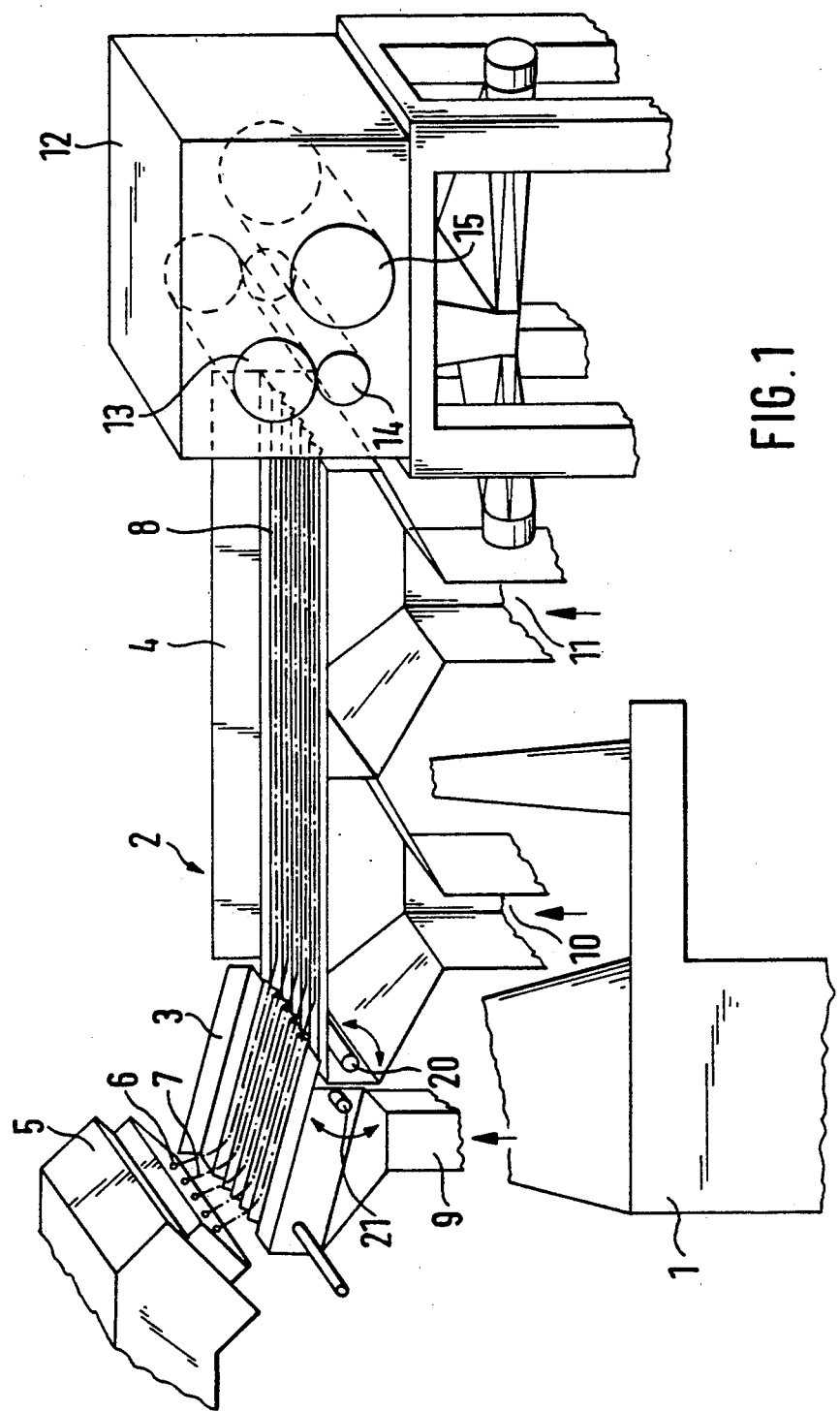
FIG. 1 is a perspective view of the device, as seen obliquely from the side.

The device shown in FIG. 1 comprises frame 1 to which feeder trough 2 is attached in a manner that is not germaine to the invention. Feeder trough 2 comprises a collecting region 3 and a transport region 4. Nozzle head 5 with nozzles 6 from which strands 7 exit in the molten state is arranged over collecting region 3. The strands 7 are fed in a known manner from an extruder (not shown) connecting with the nozzle head 5. The strands 7 are, in particular, plastic strands. The collecting region 3 and the subsequent transport region 4 are designed with a bottom surface formed of longitudinally grooved screen material; that is, individual longitudinal grooves 8 are stamped into the screen material. In total, five individual grooves 8 having five nozzles 6 standing opposite each of them are provided for the feeder trough 2 shown in FIG. 1. The arrangement of nozzles 6 relative to grooves 8 is such that strands 7 exiting from nozzles 6 move individually directly into the respective grooves 8 and are then conducted along the grooves through the collecting region into the following transport region.

Positioned below collecting region 3 and transport region 4 are gas supply chutes 9, 10, and 11, which each guide a gas current flowing in the direction of the respective arrows and generated by one or more blowers (not shown). Thus, the gas supply chute 9 supplies the collecting region 3, while the two adjoining gas supply chutes 10 and 11 supply gas to the transport region 4. The result is an arrangement in which the feeder trough 2 has longitudinally grooved screen material extending over its entire length and where, over this entire length, the screen material is supplied with a gas current passing through the feeder trough 2.

As FIG. 1 shows, the strands 7 exiting from the nozzles 6 in the molten state are received by the collecting region 3 and deflected to move in the longitudinal direction thereof, where the gas current delivered by the gas supply chute 9 causes the individual strands 7 to be carried by the gas current in the respective grooves 8 and to be conducted onward in the direction of the transport region 4. The gas current is conducted through the screen material into the grooves 8 under adequate pressure and at an adequate flow rate to hold the strands 7 away from the surfaces of the screen material so that strands 7 cannot stick. Strands 7 are directed in this manner to the substantially horizontal transport region 4 in which the gas current supplied by gas supply chutes 10 and 11 causes the strands 7 to be conducted therealong until they arrive at the right end of the transport region 4 for discharge into the grannulator 12 shown schematically. The granulator 12 can be a conventional strand granulator having feeding rolls 13 and 14 and cutting roll 15.

The generation of the longitudinally directed gas current at the upper end of the feeder trough 2 is explained in detail hereinafter with respect to FIG. 6.

It follows from the above presentation that, in the described device, the molten strands 7 are cooled only by the successive gas currents so that, finally, granulator 12 receives strand material whose surface has been adequately cooled without requiring any special drying as is the case with known devices.

In this respect it must also be pointed out that, where the cooling and solidification of the strand material being processed is advanced to the condition that the material requires no further cooling before reaching the granulator 12, the design of the grooves 8 of the transport region 4 may be such that perforated plate or screen material may not be required in the region from which the strands are discharged into the granulator.

FIGS. 2 and 3 schematically show embodiments for a groove of the collecting region 3 or transport region 4. According to FIG. 2, groove 8 is angular, and, in particular, is designed as a perforated plate 16 with openings 17. Through-openings 17 pass gas streams 18 which cause the strand 7 to be borne suspended at a distance from the surface of the plate.

The variant shown in FIG. 3 is a perforated plate 16 formed as a parabolic groove 19, which interacts with strand 7 in a similar manner as presented above with respect to FIG. 2.

FIG. 4 shows the device of FIG. 1 in which the transport region 4 pivots around an axis of rotation 20 to cause the surface to be upwardly sloped. The air current passing through the screen material or perforated plate 16 (see FIGS. 2 and 3) causes the strands 7 (only one strand is shown), despite the slight upward slope of transport region 4, to be moved upwardly in the longitudinal direction. To intensify this effect, a special perforated plate can be used, as shown in FIG. 6. This will be explained in detail below.

To give strands 7, guided by the device of FIG. 4, an additional transport component, vibrator 31 may be attached to transport region 4. Owing to suitable, well-known motion and vibration, vibrator 31 transfers to the transport region 4 mild shocks, which cause strands 7, guided in the individual grooves 8, to be positively conducted over the transport region 4.

Figure 5:
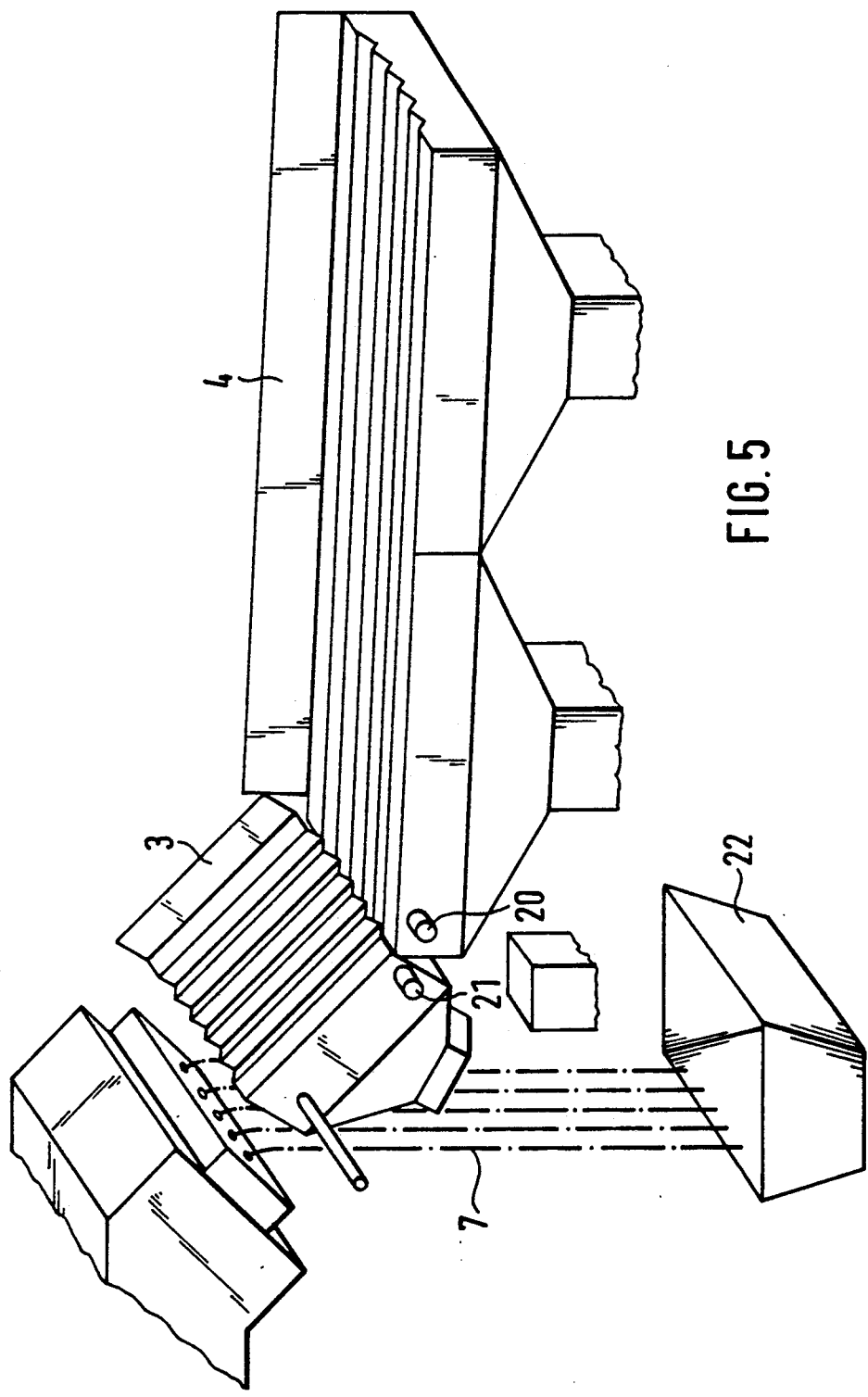
FIG. 5 shows the same device with an upwardly directed transport region, but wherein the collecting region is also raised.

FIG. 5 shows the arrangement according to FIG. 1 in another operating phase and, in particular, with an upwardly swivelled collecting region 3. Collecting region 3 assumes a position in which strands 7 exiting initially from nozzles 6 fall vertically downwardly into collecting tank 22. This operating phase typifies the startup of the device during which the strands 7 discharged from the nozzles 6 comprise material that does not manifest high-grade properties and contains impurities. For this situation, collection region 3 is adapted to be pivoted about the axis of rotation 21 upwardly from the gas supply chute 9. Once faultless material exits through nozzles 6, collecting region 3 is pivoted back into the position shown in FIG. 1, where, if desired, nozzles 6 can be passed over in known manner with a blade (not illustrated) by means of an automated device in order to ensure that only faultless material reaches the collecting region 3 when it is pivoted back to the receiving position.

FIG. 5 shows still another possible angular disposition of the transport region 4. According to FIG. 5, transport region 4 can assume a slightly downwardly sloped position by its being pivoted in a suitable manner around the axis of rotation 20.

Figure 6:
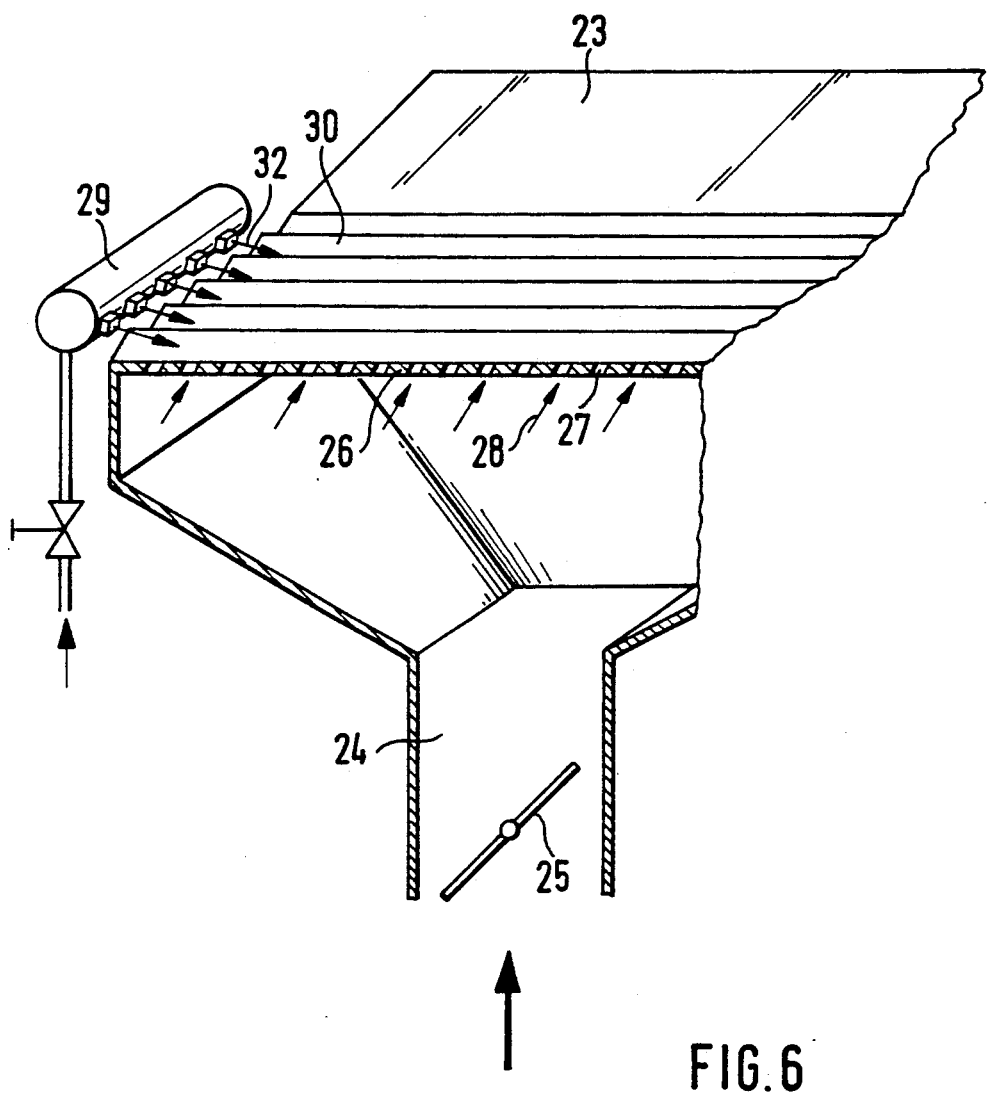
FIG. 6 is a perspective view of a collecting region with the nozzles arranged for the longitudinally directed gas current.

FIG. 6 shows an embodiment of the invention in which the collecting region 23 is arranged in a horizontal position. Collecting region 23 is provided with air supply chute 24, in which throttle flap 25 is installed in order to control, if desired, the gas current through the gas supply chute 24. To provide for the reliable transport of the supplied strands owing to the horizontal position of the collecting region 23, the collecting region is constructed of a grooved perforated plate 26 in which openings 27 are inclined in the direction of movement of the strands (not shown). The gas current (shown by arrows 28) is directed in such a manner, due to the inclination of the openings 27, that it produces a transport component with respect to the strands. Additionally, supplemental gas nozzles 29 are provided, and arranged such that only one gas nozzle is associated with each groove 30. Gas nozzles 29 blow a gas current 32 into the individual grooves 30 and provide that the strands flowing in on the longitudinally grooved perforated plate 26 are deflected without making contact with perforated plate 26 and are borne and guided along grooves 30.

It should be appreciated that the collecting region 3 described with respect to FIG. 4 and shown in FIGS. 1, 4, and 5 can be provided with a perforated plate 26 having included openings 27.

The above description of the invention is directed primarily to preferred embdoiments and practices thereof. It will be apparent to those skilled in the art that changes and modifications can be made to the device disclosed herein without departing from the spirit and scope of the invention as defined by the following claims.

We claim:

1. An apparatus to cool and granulate strands made of material, which exit in a molten state from nozzles, said apparatus comprising:
    a feeder trough having a receiving end positioned below the nozzles for reception of said strands;
    a granulator following the feeder trough;
    said feeder trough being formed over substantially its entire length by perforated plate material having longitudinally extending grooves, each of which guides only a single strand;
    means for passing a gas current through said plate material for bearing said strands along said grooves in spaced relation from said plate material, and
    means for generating along said grooves a longitudinally directed gas flow for collecting said strands and directing them along said feeder trough.

2. Apparatus as claimed in claim 1 wherein said means for generating a longitudinally directed gas flow along said grooves comprises a plurality of gas nozzles at the receiving end of said feeder trough and disposed to discharge gas streams inclinedly downwardly onto said plate material.

3. Apparatus as claimed in claim 1 wherein said gas current passing means cimprises openings formed in said plate material inclined in a direction to induce movement of said strands along said grooves.

4. Apparatus as claimed in any one of claims 1, 2 and 3 wherein said feeder trough incudes a collecting region at the receiving end of said feeder trough, said collecting region being inclined downwardly along said feeder trough at an angle of at least 10° relative to a horizontal line.

5. Apparatus as claimed in claim 1, wherein a plurality of mutually adjoining gas supply chutes are provided below the feeder trough.

6. Apparatus as claimed in claim 1, wherein the feeder trough is angularly adjustable relative to a horizontal line.

7. Apparatus as claimed in claim 6, wherein a collecting region is disposed at one end of said feeder trough and is pivotable and movable separately from a remainder of said feeder trough.

8. Apparatus as claimed in claim 1, wherein said feeder trough downstream of a collecting region is provided with vibrator means for generating a thrust component for the strands.

* * * * *